United States Patent
Han et al.

(10) Patent No.: US 11,163,285 B2
(45) Date of Patent: Nov. 2, 2021

(54) SERVO DRIVER

(71) Applicant: Siemens Aktiengesellschaft, Munich (DE)

(72) Inventors: Ying Han, Nanjing (CN); Jian Yuan Wu, Nanjing (CN)

(73) Assignee: Siemens Aktiengesellschaft, Munich (DE)

( * ) Notice: Subject to any disclaimer, the term of this patent is extended or adjusted under 35 U.S.C. 154(b) by 21 days.

(21) Appl. No.: 16/609,812

(22) PCT Filed: Apr. 20, 2018

(86) PCT No.: PCT/EP2018/060147
§ 371 (c)(1),
(2) Date: Oct. 31, 2019

(87) PCT Pub. No.: WO2018/206266
PCT Pub. Date: Nov. 15, 2018

(65) Prior Publication Data
US 2020/0073350 A1 Mar. 5, 2020

(30) Foreign Application Priority Data
May 8, 2017 (CN) .......................... 201710317916.3

(51) Int. Cl.
*G05B 19/045* (2006.01)

(52) U.S. Cl.
CPC .. *G05B 19/045* (2013.01); *G05B 2219/25392* (2013.01)

(58) Field of Classification Search
CPC .................... G05B 19/045; G05B 2219/25392
(Continued)

(56) References Cited

U.S. PATENT DOCUMENTS 5,691,898 A * 11/1997 Rosenberg ............ A63F 13/285
700/85
6,191,543 B1  2/2001 Lai et al.
(Continued)

FOREIGN PATENT DOCUMENTS

CN    2358632 Y    1/2000
CN    2768055 Y    3/2006
(Continued)

OTHER PUBLICATIONS

Written Opinion of the International Searching Authority PCT/ISA/237 for International Application No. PCT/EP2018/080147 filed Apr. 20, 2018.
(Continued)

*Primary Examiner* — Jorge L Carrasquillo
(74) *Attorney, Agent, or Firm* — Harness, Dickey & Pierce, P.L.C.

(57) ABSTRACT

A servo driver includes: a driver, a pulse conversion module and a pulse interface. The pulse conversion module is connected between the pulse interface and the driver, and the pulse conversion module converts the type of a pulse control signal received by the pulse interface from an upper computer or a PLC and then outputs same to the driver. The type of the pulse control signal includes at least one of a clockwise and counter-clockwise pulse control type, a pulse plus direction control type and an AB-phase input control type. In an embodiment, the pulse conversion module is used to convert the type of the pulse control signal from the upper computer or the PLC, so that the driver can be compatible with an upper computer or a PLC having a different control signal type.

13 Claims, 2 Drawing Sheets

(58) Field of Classification Search
 USPC .......................................................... 318/599
 See application file for complete search history.

(56) References Cited

U.S. PATENT DOCUMENTS

| | | | |
|---|---|---|---|
| 7,271,576 B1* | 9/2007 | O'Harra, II | G01R 27/04 |
| | | | 324/73.1 |
| 2006/0271251 A1 | 11/2006 | Hopkins | |
| 2010/0017954 A1* | 1/2010 | Peterson | A61H 33/0087 |
| | | | 4/541.2 |
| 2015/0069948 A1* | 3/2015 | Yap | H02P 27/08 |
| | | | 318/599 |
| 2015/0097946 A1* | 4/2015 | Stout | H04N 5/222 |
| | | | 348/135 |
| 2018/0243527 A1* | 8/2018 | Zapol | A61M 16/0666 |

FOREIGN PATENT DOCUMENTS

| | | |
|---|---|---|
| CN | 104925600 A | 9/2015 |
| CN | 103389684 B | 2/2016 |
| CN | 205363925 U | 7/2016 |
| CN | 106547291 A | 3/2017 |
| JP | H08247788 A | 9/1996 |
| TW | 201338944 A | 10/2013 |

OTHER PUBLICATIONS

International Search Report PCT/ISA/210 for International Application No. PCT/EP2018/060147 filed Apr. 20, 2018.
Chinese Office Action dated Feb. 6, 2020.
European Office Action dated Dec. 3, 2020.

\* cited by examiner

SERVO DRIVER

PRIORITY STATEMENT

This application is the national phase under 35 U.S.C. § 371 of PCT International Application No. PCT/EP2018/060147, which has an International filing date of Apr. 20, 2018, which designated the United States of America, and which claims priority to Chinese Patent Application No. CN 201710317916.3 filed May 8, 2017, the entire contents of which are hereby incorporated herein by reference.

FIELD

Embodiments of invention generally relate to a servo driver, and in particular to a servo driver which is capable of realizing the switching of a pulse type to adapt to various upper computers or PLCs.

BACKGROUND

When pulse control is used, the pulse receiving mode for a servo driver can be divided into three types: clockwise and counter-clockwise pulse control (CW+CCW), pulse plus direction control (pulse+direction) and AB-phase input control (also referred to as phase difference control, which is common in handwheel control), and the waveform diagrams of these three pulse forms are different from one another, for example, as shown in FIG. 1.

In general, at present, many upper computers or PLCs can only provide a pulse plus direction output mode; however, the pulse plus direction output mode has a relatively poor anti-interference performance. In addition, servo drivers in the prior art generally cannot switch the pulse mode. Therefore, the driver and the upper computer/PLC in the prior art are limited in terms of type-selection matching or function implementation. If a pulse signal of an upper computer or a PLC cannot match that of a servo driver, at present, only the type selection of the servo driver can be abandoned, or the use of the function thereof may be limited.

SUMMARY

With regard to the problems in the prior art, the embodiments of the present invention provide a novel servo driver. The servo driver of at least one embodiment can convert the type of a pulse signal, so as to improve upon or even solve many problems caused by mismatching of the pulse signal type.

Specifically, at least one embodiment of the present invention provides a servo driver, comprising: a driver, a pulse conversion module and a pulse interface, wherein the pulse conversion module is connected between the pulse interface and the driver, and the pulse conversion module converts the type of a pulse control signal received by the pulse interface, and then outputs same to the driver, with the type of the pulse control signal comprising at least one of a clockwise and counter-clockwise pulse control type, a pulse plus direction control type and an AB-phase input control type.

The servo driver of at least one embodiment of the present invention can use a pulse conversion module to convert the type of a pulse from an upper computer or a PLC, so as to solve the limitations where the type selection of the driver or the upper computer/PLC cannot be performed or the function thereof cannot be used due to the mismatching of the pulse signal type.

BRIEF DESCRIPTION OF THE DRAWINGS

The accompanying drawings are included to provide further understanding of the present invention and are incorporated in and constitute a part of the present application, show the embodiments of the present invention, and serve, together with the description, to explain the principles of the present invention. In the accompanying drawings.

DESCRIPTION OF REFERENCE SIGNS

Figure 1:
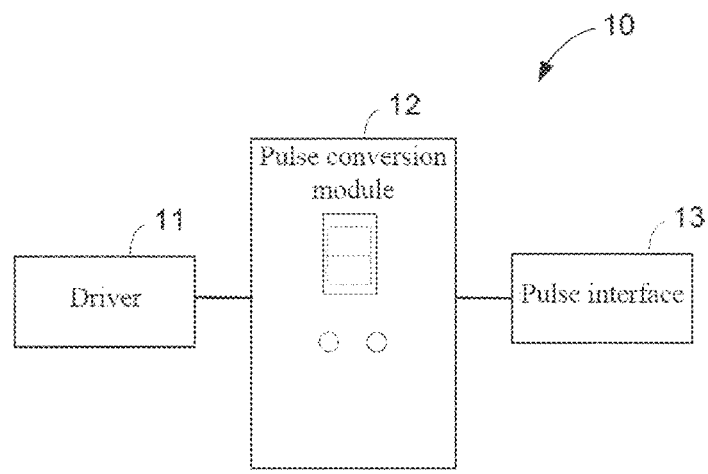
FIG. 1 exemplarily shows the pulse forms of three types of pulse control signals.

10 Servo driver
11 Driver
12 Pulse conversion module
13 Pulse interface
14 Complex programmable logic device
15 Display
16 Button
17 First transceiver
18 Second transceiver

DETAILED DESCRIPTION OF EXAMPLE EMBODIMENTS

Specifically, at least one embodiment of the present invention provides a servo driver, comprising: a driver, a pulse conversion module and a pulse interface, wherein the pulse conversion module is connected between the pulse interface and the driver, and the pulse conversion module converts the type of a pulse control signal received by the pulse interface, and then outputs same to the driver, with the type of the pulse control signal comprising at least one of a clockwise and counter-clockwise pulse control type, a pulse plus direction control type and an AB-phase input control type.

The servo driver of at least one embodiment of the present invention can use a pulse conversion module to convert the type of a pulse from an upper computer or a PLC, so as to solve the limitations where the type selection of the driver or the upper computer/PLC cannot be performed or the function thereof cannot be used due to the mismatching of the pulse signal type.

According to one embodiment of the present invention, in the servo driver, the pulse conversion module comprises a complex programmable logic device, and pulse conversion logic for realizing the conversion between different pulse control system signal types is provided in the complex programmable logic device. The complex programmable logic device can be used for parallel processing, so as to eliminate the problem of time delays.

According to one embodiment of the present invention, in the servo driver, the pulse conversion module further comprises a display and a button which are in signal connection with the complex programmable logic device, wherein a user switches between various types of conversion modes via the button, and the display at least displays a conversion mode which is currently implemented by the pulse conversion module, so as to facilitate the user in operating and selecting a conversion mode for the pulse control signal.

According to one embodiment of the present invention, in the servo driver, the display is a 1-bit digital display, and different numbers displayed on the display represent different conversion modes.

According to one embodiment of the present invention, in the servo driver, the pulse conversion module comprises two buttons, and the two buttons respectively realize the operations of adding one to and subtracting one from a number on the 1-bit digital display when being pressed down, so as to switch the conversion mode by means of either of the two buttons.

According to one embodiment of the present invention, in the servo driver, the pulse conversion module further comprises a first transceiver and a second transceiver which are in signal connection with the complex programmable logic device, wherein the first transceiver is in signal connection with the driver, and the second transceiver is in signal connection with the pulse interface. In this way, the pulse conversion module can be provided outside the driver, for example, on a cabinet, and the two are connected wirelessly.

According to one embodiment of the present invention, in the servo driver, the pulse conversion module is provided on a housing of the servo driver or is provided outside a cabinet accommodating the servo driver, so as to expose the display and the buttons.

It should be appreciated that the above-mentioned general description and the following detailed description of the present invention are all example and illustrative, and are intended to provide further explanations for the present invention as claimed in the claims.

The embodiments of the present invention will now be described with detailed reference to the drawings.

Detailed reference will now be made to the preferred embodiments of the present invention, and the examples thereof are shown in the accompanying drawings. Wherever possible, the same or similar parts will be denoted by using the same reference signs in all the accompanying drawings.

In addition, although the terms used in embodiments of the present invention are selected from common general terms, some terms mentioned in the description of embodiments of the present invention may be selected by the applicant at his or her discretion, and the detailed meanings thereof are explained in the relevant part of the description of embodiments of the present invention.

In addition, embodiments of the present invention should be understood not only by the terms actually used, but also by the meaning contained in each term.

Figure 2:
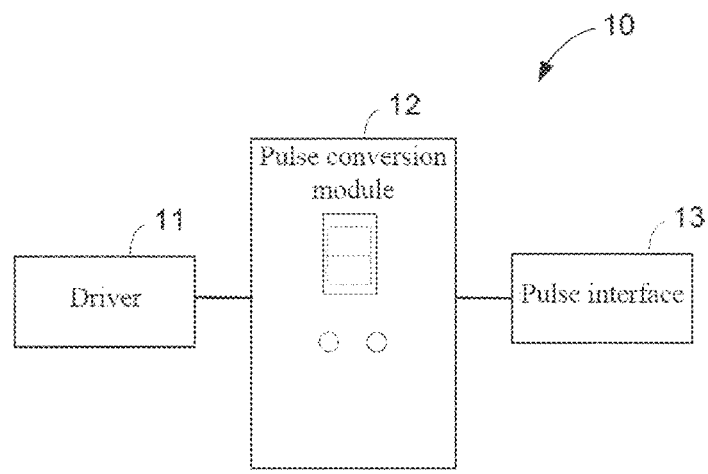
FIG. 2 shows a schematic structure of a servo driver according to the present invention.

Firstly, with reference to FIG. 2, the servo driver 10 of an embodiment of the present invention mainly comprises: a driver 11, a pulse conversion module 12 and a pulse interface 13. The pulse conversion module 12 is connected between the driver 11 and the pulse interface 13, wherein the pulse conversion module 12 converts the type of a pulse control signal received by the pulse interface 13, and then outputs same to the driver 11. The type of the pulse control signal comprises at least one of a clockwise and counter-clockwise pulse control type (CW+CCW), a pulse plus direction control type (pulse+direction) and an AB-phase input control type (also referred to as phase difference control).

Therefore, the servo driver 10 of an embodiment of the present invention may use the pulse conversion module 12 to convert the type of a pulse from an upper computer or a PLC, so as to solve the limitations where the type selection of the driver or the upper computer/PLC cannot be performed or the functions thereof cannot be used due to the mismatching of the pulse signal type. In addition, as mentioned above, any form of conversion between pulse types can also improve the anti-interference performance of the servo driver 10, thereby avoiding a pulse loss or increase caused by pulse mismatching. The pulse conversion module 12 may be a small-sized module with a small volume, so as to be conveniently configured on the servo driver 10 or provided on a cabinet accommodating the servo driver 10.

Figure 3:
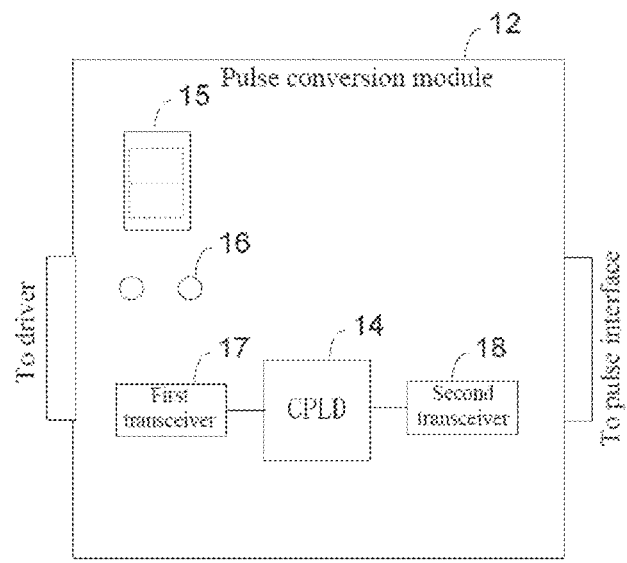
FIG. 3 shows one embodiment of a pulse conversion module according to the present invention.

FIG. 3 shows one embodiment of the pulse conversion module 12 according to the present invention. As shown in FIG. 3, the pulse conversion module 12 may further comprise a complex programmable logic device (CPLD) 14, a display 15, buttons 16, a first transceiver 17 and a second transceiver 18. The complex programmable logic device 14 may perform parallel processing, so as to eliminate the problem of time delays. In addition, the use of the complex programmable logic device 14 also has the advantages of a low cost and clear logic, etc. A pulse conversion logic for realizing the conversion between different pulse control system signal types may be provided in the complex programmable logic device 14.

For example, the pulse conversion logic may be hardware in the form of a semiconductor device, and may also be a data structure, a mapping table, a code, etc., in the form of a conversion table stored in a memory in the complex programmable logic device 14. When in operation, the pulse conversion logic may convert a pulse control signal (being of a clockwise and counter-clockwise pulse control type in this example) from the pulse interface 13 according to a conversion method (for example, converting same from a clockwise and counter-clockwise pulse control type into a pulse plus direction control type) selected by a user, and output the converted pulse control signal (being of a pulse plus direction control type in this example).

According to one embodiment of the present invention, the pulse conversion module 12 may be a separate device further comprising the display 15 and the button 16 which are in signal connection with the complex programmable logic device 14. The volume of the device may be so small that it can be conveniently provided on a housing of the servo driver or provided outside a cabinet accommodating the servo driver 10, so as to expose the display 15 and the buttons 16. In this embodiment, a user can switch between various types of conversion modes via the button 16, while the display 15 at least displays a conversion mode which is currently implemented by the pulse conversion module 12. In addition, the display 15 may be a 1-bit digital display, and different numbers displayed on the display 15 represent different conversion modes.

Figure 4:
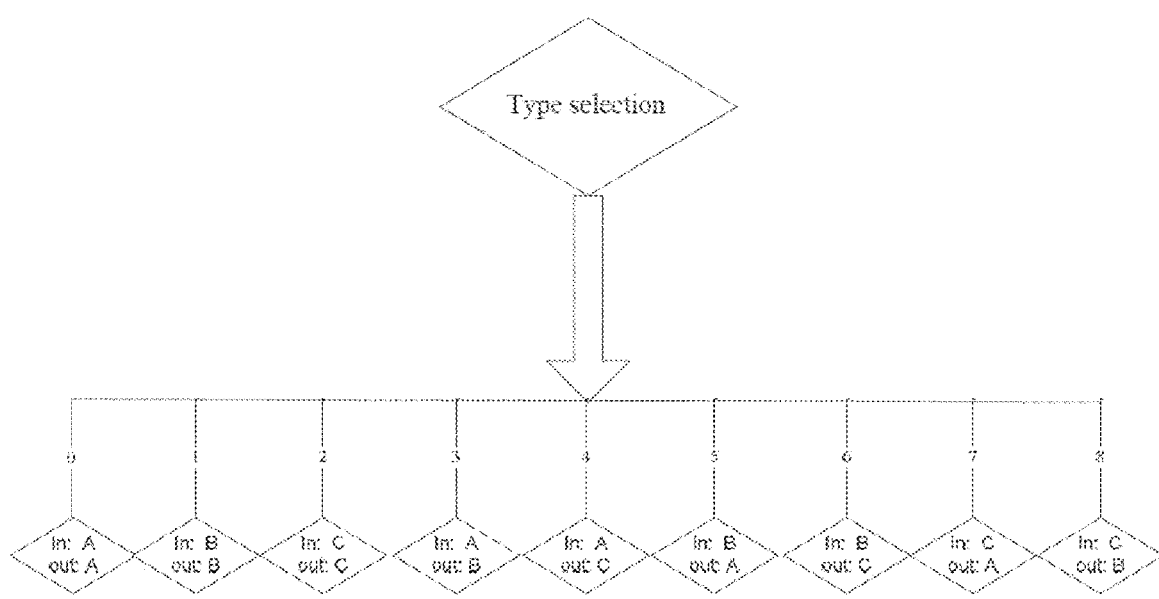
FIG. 4 shows one embodiment of a pulse conversion mode.

For example, the 1-bit digital display can at least display the numbers 0 to 8, wherein each of the numbers corresponds to one conversion mode. With reference to FIG. 4, after type selection is performed (via the button 16), each number displayed on the 1-bit digital display 15 corresponds to one conversion method. In FIG. 4, as an example, "A" represents the clockwise and counter-clockwise pulse control type (CW+CCW), "B" represents the pulse plus direction control type (pulse+direction), and "C" represents the AB-phase input control type (also referred to as phase difference control). Thus, according to FIG. 4, the number 0 (the number being displayed by the 1-digit digital display 15) represents a conversion mode where an input and an output are both of the clockwise and counter-clockwise pulse control type (CW+CCW), and the number 4 represents a conversion mode where the input is of the clockwise and counter-clockwise pulse control type (CW+CCW) and the output is of the AB-phase input control type. Therefore, the nine numbers 0-8 can represent all the conversion modes between every two of the three control types. Therefore, as long as a user correctly selects, during use, one conversion mode by firstly using the button 16, an upper computer/PLC and a driver of any pulse type can be used for connection, so as to achieve the compatibility between the upper computer/PLC and drivers of different pulse types.

In the embodiment shown in FIG. 3, the pulse conversion module 12 uses two buttons 16. For example, the two buttons 16 respectively realize the operations of adding one to and subtracting one from a number on the 1-bit digital display when being pressed down, so as to switch the conversion mode by means of either of the two buttons. In another embodiment, the pulse conversion module 12 may also achieve a similar function by only using a single button 16 that performs an operation of adding one (or subtracting one).

In addition, in an embodiment where the pulse conversion module 12 is provided outside a cabinet accommodating the servo driver 10, the pulse conversion module 12 may further comprise a first transceiver 17 and a second transceiver 18 which are in signal connection with the complex programmable logic device 14, wherein the first transceiver 17 is in signal connection with the driver 11, and the second transceiver 18 is in signal connection with the pulse interface 13.

In summary, the servo driver of an embodiment of the present invention can convert the three pulse forms arbitrarily, and a customer can convert, according to requirements during use, a pulse form into a type that can be identified or can be expected to be used. Therefore, an embodiment of the present invention can solve the limitations where the type selection of a driver or an upper computer/PLC cannot be performed or the function thereof cannot be used due to the mismatching of the pulse signal type. In addition, any form of conversion between pulse types can also improve the anti-interference performance of the servo driver, thereby avoiding a pulse loss or increase caused by pulse mismatching.

It will be apparent for a person skilled in the art that various modifications and variations may be made to the example embodiments of the present invention without departing from the spirit and scope of the present invention. Therefore, it is intended that the present invention covers the modifications and variations of the present invention that fall within the scope of the appended claims and their equivalents.

The invention claimed is:
1. A servo driver, comprising:
a driver;
a pulse interface; and
a pulse conversion module connected between the pulse interface and the driver, the pulse conversion module configured to
convert a type of a pulse control signal received by the pulse interface, the type of the pulse control signal including at least one of (i) a clockwise pulse control type and a counter-clockwise pulse control type, (ii) a pulse plus direction control type or (iii) an AB-phase input control type, and
output the pulse control signal, once converted, to the driver;
wherein the pulse conversion module includes a complex programmable logic device, which further includes a pulse conversion logic configured to realize pulse conversion between different pulse control signal types;
wherein the pulse conversion module further includes a display and at least one button, the display and the at least one button being in signal communication with the complex programmable logic device;
wherein the at least one button is configured to permit a user to switch between various types of conversion modes;
wherein the display is configured to display a conversion mode currently implemented by the pulse conversion module; and
wherein the display is a 1-bit digital display configured to display different numbers, each of the different numbers representing a different conversion mode.

2. The servo driver of claim 1, wherein the at least one button includes a first button and a second button,
the first button is configured to be pressed down to switch the conversion mode and to add one to a number on the 1-bit digital display, and
the second button is configured to be pressed down to switch the conversion mode and to subtract one from the number on the 1-bit digital display.

3. The servo driver of claim 2, wherein
the pulse conversion module includes a first transceiver and a second transceiver,
the first transceiver and the second transceiver are in signal communication with the complex programmable logic device,
the first transceiver is in signal communication with the driver, and
the second transceiver is in signal communication with the pulse interface.

4. The servo driver of claim 3, further comprising:
a housing, wherein
the pulse conversion module is provided on the housing so as to expose the display, the first button and the second button.

5. The servo driver of claim 3, further comprising:
a cabinet accommodating the servo driver, wherein
the pulse conversion module is arranged outside the cabinet to expose the display and the at least one button.

6. The servo driver of claim 1, wherein
the pulse conversion module further includes a first transceiver and a second transceiver,
the first transceiver and the second transceiver are in signal communication with the complex programmable logic device,
the first transceiver is in signal communication with the driver, and
the second transceiver is in signal communication with the pulse interface.

7. The servo driver of claim 1, further comprising:
a housing, wherein
the pulse conversion module is arranged on the housing so as to expose the display and the at least one button.

8. The servo driver of claim 7, wherein
the pulse conversion module includes a first transceiver and a second transceiver,
the first transceiver and the second transceiver are in signal communication with the complex programmable logic device,
the first transceiver is in signal communication with the driver, and
the second transceiver is in signal communication with the pulse interface.

9. The servo driver of claim 1, further comprising:
a cabinet accommodating the servo driver, wherein the pulse conversion module is arranged outside the cabinet to expose the display and the at least one button.

10. A pulse conversion module for a servo driver, the pulse conversion module being connectable between a pulse interface and a driver of a servo driver, and the pulse conversion module configured to
convert a type of a pulse control signal received by the pulse interface, the type of the pulse control signal including at least one of (i) a clockwise pulse control type and a counter-clockwise pulse control type, (ii) a pulse plus direction control type or (iii) an AB-phase input control type, and
output the pulse control signal, once converted, to the driver,
wherein the pulse conversion module includes a complex programmable logic device, which further includes a pulse conversion logic configured to realize pulse conversion between different pulse control signal types,
wherein the pulse conversion module further includes a display and at least one button, the display and the at least one button being in signal communication with the complex programmable logic device,
wherein the at least one button is configured to permit a user to switch between various types of conversion modes,
wherein the display is configured to display a conversion mode currently implemented by the pulse conversion module, and
wherein the display is a 1-bit digital display configured to display different numbers, each of the different numbers representing a different conversion mode.

11. The pulse conversion module of claim 10, wherein
the at least one button includes a first button and a second button,
the first button is configured to be pressed down to switch the conversion mode and to add one to a number on the 1-bit digital display, and
the second button is configured to be pressed down to switch the conversion mode and to subtract one from the number on the 1-bit digital display.

12. The pulse conversion module of claim 10, further comprising:
a first transceiver; and
a second transceiver, wherein
the first transceiver and the second transceiver are in signal communication with the complex programmable logic device,
the first transceiver is in signal communication with the driver, and
the second transceiver is in signal communication with the pulse interface.

13. The pulse conversion module of claim 10, wherein the pulse conversion module is configured to be arranged on a housing of the servo driver or outside a cabinet accommodating the servo driver, so as to expose the display and the at least one button.

* * * * *